(12) United States Patent
Valera et al.

(10) Patent No.: US 8,611,014 B2
(45) Date of Patent: Dec. 17, 2013

(54) OPTICAL WAVEGUIDE AND DISPLAY DEVICE

(75) Inventors: Mohmed Salim Valera, Kent (GB); Michael David Simmonds, Kent (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 13/264,551

(22) PCT Filed: Apr. 13, 2010

(86) PCT No.: PCT/GB2010/000734
§ 371 (c)(1),
(2), (4) Date: Oct. 14, 2011

(87) PCT Pub. No.: WO2010/119240
PCT Pub. Date: Oct. 21, 2010

(65) Prior Publication Data
US 2012/0033306 A1    Feb. 9, 2012

(30) Foreign Application Priority Data
Apr. 14, 2009 (EP) ..................................... 09275024
Apr. 14, 2009 (GB) .................................. 0906266.2

(51) Int. Cl.
*G02B 27/14* (2006.01)
(52) U.S. Cl.
USPC .......................................... 359/630; 359/633
(58) Field of Classification Search
USPC .......................................... 359/627–640, 726
See application file for complete search history.

(56) References Cited

U.S. PATENT DOCUMENTS

| 5,970,190 A | 10/1999 | Fu et al. |
| 6,509,529 B2 | 1/2003 | Kamath et al. |
| 7,751,122 B2 * | 7/2010 | Amitai ........................ 359/630 |
| 8,120,857 B2 * | 2/2012 | Hedges et al. ............... 359/630 |
| 2004/0246743 A1 | 12/2004 | Lee et al. |
| 2005/0002611 A1 * | 1/2005 | Levola ........................... 385/37 |

FOREIGN PATENT DOCUMENTS

| WO | WO 2008/038058 A1 | 4/2008 |
| WO | WO 2008/071830 A1 | 6/2008 |
| WO | WO 2008/081070 A1 | 7/2008 |
| WO | WO 2008/148927 A1 | 12/2008 |

OTHER PUBLICATIONS

International Search Report dated Jun. 8, 2010 issued in PCT/GB2010/000734.
Extended European Search Report dated Sep. 3, 2009 issued in 09275024.9.
UK Search Report dated Jun. 25, 2009 issued in GB0906266.2.
International Preliminary Report on Patentability and Written Opinion, dated Oct. 27, 2011 from related International Application No. PCT/GB2010/000734.

* cited by examiner

*Primary Examiner* — Mohammed Hasan
(74) *Attorney, Agent, or Firm* — Scully, Scott, Murphy & Presser, PC

(57) ABSTRACT

In a slab waveguide which expands an image-bearing pupil into a visible image, reflective edge surfaces are used to redirect once-diffracted light back through the same grating structure. The number of separate grating structures thereby can be reduced to two or even one, compared to three in the prior art.

13 Claims, 4 Drawing Sheets

OPTICAL WAVEGUIDE AND DISPLAY DEVICE

BACKGROUND OF THE INVENTION

This invention relates to an optical waveguide and a display device. In particular it is relevant to display devices in which image bearing light is injected into a waveguide, is expanded in two orthogonal dimensions to form a visible image and is released from the waveguide.

A prior art device of this type is shown in U.S. Pat. No. 6,509,529. In that device a slab waveguide contains three separate differently-oriented diffraction gratings, one to inject the light into the waveguide, a second to expand it in a first dimension, and a third to expand it in a second dimension and to release the thereby-formed image from the waveguide. Whilst this arrangement is simpler than earlier proposals in which the third grating is in a separate waveguide from the first two, it still poses manufacturing challenges in that the three differently-oriented gratings (whether produced holographically or a surface-relief gratings) still must be very accurately aligned relative to each other if good results are to be achieved.

The present invention seeks to alleviate these difficulties by offering a solution which can be implemented using fewer diffraction gratings.

SUMMARY OF THE INVENTION

According to an aspect of the invention an optical waveguide in which in operation light propagates by total internal reflection comprises a grating structure having three diffraction regions, a first diffraction region being for diffracting image-bearing light into the waveguide, a second diffraction region being for further diffracting the image-bearing light so as to expand it in a first dimension and a third diffraction region being for further diffracting the image-bearing light so as to expand it in a second dimension and for releasing it from the waveguide as a visible image, wherein at least two of said diffraction regions have aligned gratings and at least one reflecting surface is provided which reflects light received from one of said at least two diffraction regions back to the other of said at least two diffraction regions for a further diffraction.

The at least two aligned diffraction regions may have gratings with uniform orientation and/or spatial frequency, although the structure of the grating may vary. For example, the first diffraction region and the second diffraction region may have uniform orientation and/or spatial frequency, but the fringes of the first region may be higher than those of the second region.

A said reflecting surface may be perpendicular to two parallel surfaces of the waveguide between which light propagates within the waveguide parallel to those surfaces by total internal reflection.

A said reflecting surface may be an edge surface of the waveguide.

Alternatively or in addition a said reflecting surface may be embedded within the waveguide.

A said reflecting surface may have an optical coating whereby to control the reflectance of the surface and/or to control the planarization of light reflected therefrom.

In a first embodiment a said reflecting surface may be positioned to receive image-bearing light which has been expanded in the first dimension by diffraction by the second diffraction region and to reflect it back to the grating structure for further diffraction by the third diffraction region to expand it in the second dimension.

In a second embodiment a said reflecting surface may be positioned to receive light which has been diffracted into the waveguide by the first diffraction region and to reflect it back to the grating structure for diffraction by the second diffraction region to expand it in the first dimension.

The second and third diffraction regions may comprise identically-oriented gratings which respectively diffract the light to expand it in the first and second dimensions.

Alternatively or in addition the second and the third diffraction regions may comprise identically oriented gratings which respectively diffract the light into the waveguide and expand it in the first dimension.

In both of these embodiments, the use of a reflecting surface enables identically-oriented gratings to be used for light-injection and for expansion in the first dimension, and alternatively or in addition for expansion in the first and second dimensions. Thus it is possible to use no more than two (and preferably only one) grating orientations for all diffraction operations within the waveguide.

Consequently, at least two of the gratings within the waveguide can be formed as a single grating, different parts of which are used for different diffraction operations. Alternatively they can be formed as two or three discrete gratings, all having the same orientation. Because their orientations are the same they effectively can be formed in one manufacturing operation, and thus the likelihood of angular misalignment is much reduced. We include such discrete but identical gratings within the term "single grating" in this specification.

When identically-orientated gratings are used for only two of the three diffraction functions, the other function may be effected by a further grating. In one of the forgoing embodiments that function is the injection of image-bearing light into the waveguide. In the other it is the expansion of the light in the second dimension and its release from the waveguide as a visible image.

The waveguide of the invention may be employed in a variety of display devices including but not limited to helmet-mounted displays, head-mounted displays (e.g. spectacles or goggles) or head-up displays e.g. for aircraft or other vehicles.

The invention now will be described merely by way of example with reference to the accompanying drawings wherein;

DETAILED DESCRIPTION OF THE INVENTION

Figure 1:
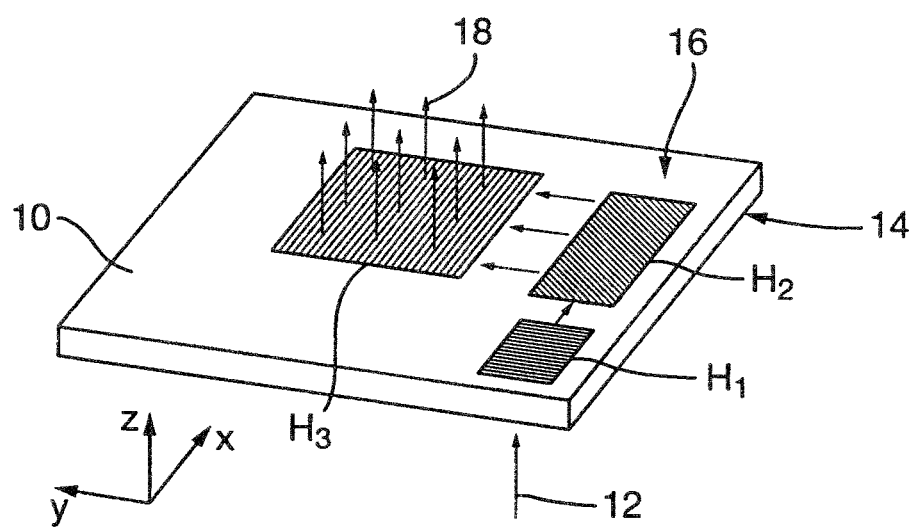
FIG. 1 (taken from the aforementioned U.S. Pat. No. 6,580,529) shows a prior art apparatus.

Referring to FIG. 1, a prior art slab waveguide 10 incorporates three separate differently-oriented gratings $H_1$, $H_2$, $H_3$. Image-bearing light 12 is incident in the Z-direction on grating $H_1$, the grooves or other diffracting structure of which is oriented in the y-direction. The grating turns the light through 90°, which then propagates between the parallel faces 14, 16 of the waveguide in the x-direction. The light then encounters grating $H_2$, the diffracting structure of which is oriented at 45° to the x and y directions. This grating expands the image-bearing light in the x-dimension, turns it through 90° into the y direction and presents it to the grating $H_3$, the diffracting structure of which is oriented in the x-direction. The grating expands the light in the y-dimension and releases in the z-direction as a two-dimensional image 18 visible to a observer. The preferred embodiments of the present invention now to be described achieve the same functionality in an alternative way.

Figure 2:
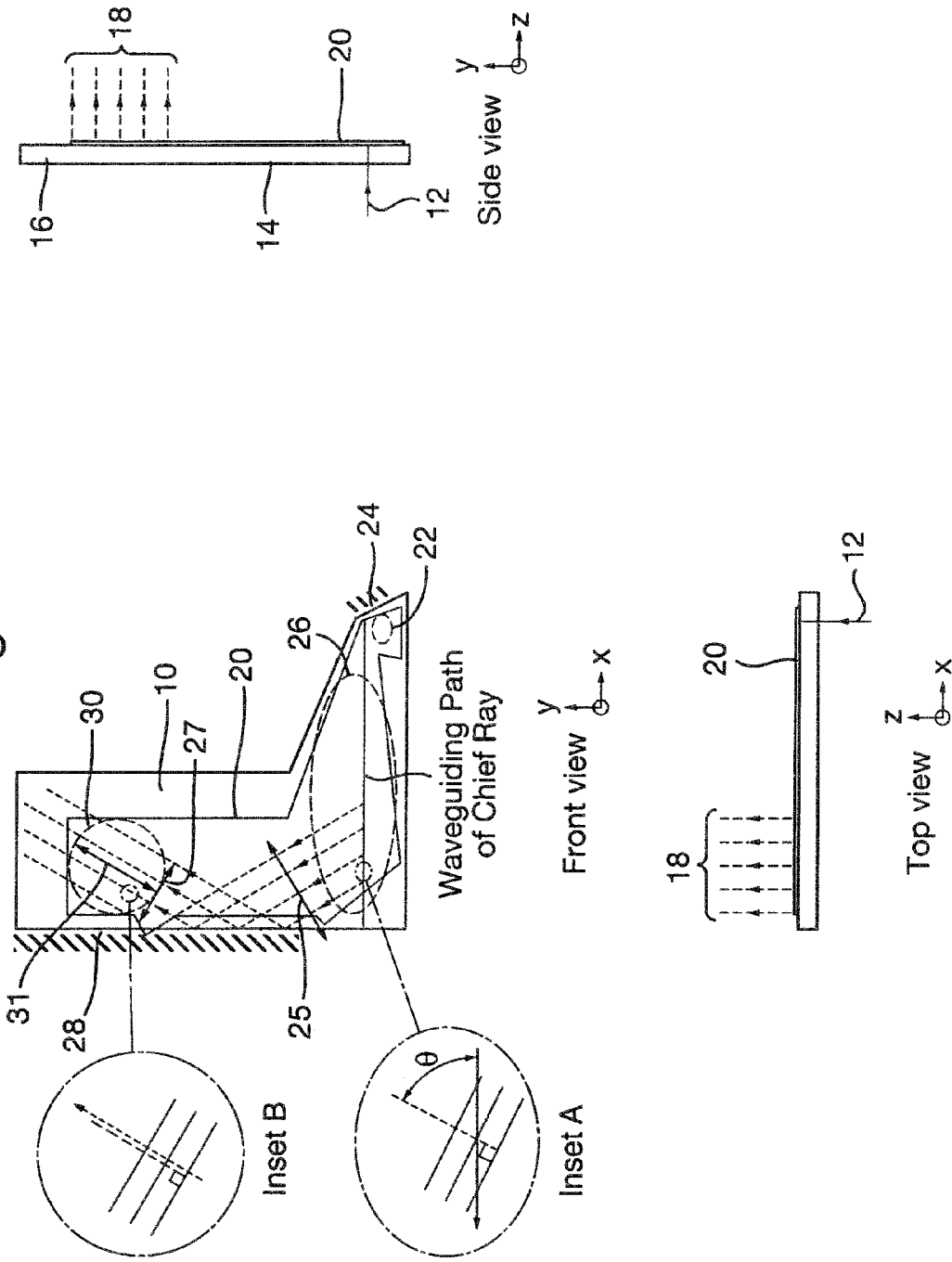
FIGS. 2, 3 and 4 show three embodiments of the present invention.

In FIG. 2, a slab waveguide 10 of BK7 glass again has parallel principal surfaces 14, 16 between which waveguide (propagation) of light takes place. It however comprises a single grating 20 of uniform orientation (the grooves are inclined at 30 degrees to the x-axis) and spatial frequency (groove pitch d=435 nm) throughout, and which with the assistance of two specular reflecting surfaces delivers a visible image.

Collimated image bearing light 12 is incident normally on a first input portion, or region, 22 of the grating 20 and is diffracted within it through 90° so as to propagate by total internal reflection through the waveguide to an edge surface 24 of the waveguide. This surface is planar and perpendicular to the principal surfaces 14, 16 and is inclined to the y-axis of the slab at an angle $\alpha°$. The surface 24 is polished and metallised to form a specular reflector. The angle $\alpha$ is chosen (here it is 30°) so that the propagating light incident upon it is reflected with its chief ray then propagating along the x-axis of the waveguide. The light in the incident at an angle $\theta$ on a second or turning portion, or region, 26 of the grating 20. This area of the grating, whilst having the same orientation and spatial frequency as the area 22, is optically coated so as to have a low diffraction efficiency (between 5% and 30%). The light rays are thus partially diffracted, leading to pupil expansion of the image-bearing light in a first dimension, shown at 25 in FIG. 2. The diffracted rays are directed by the grating so as to propagate through the waveguide to a second edge surface 28. This edge surface, also perpendicular to the principal planes 14, 16, is polished and metallised similarly to edge surface 24 to form a second specular reflector. Light incident upon it is reflected towards a third or output part, or region, 30 of the grating 20. The light rays are incident on the second part 26 of the grating so that the chief ray makes an angle $\theta$ of 60° to the normal to the grating orientation (the direction of the grooves) as shown at insert A of FIG. 2. The subsequent reflection of the diffracted rays at surface 28 results in the reflected chief ray (now having a reflected first expansion dimension 27) propagating through the waveguide and being incident normally on the output part 30 of the grating, as shown at insert B, that is, the reflected chief ray makes an angle of, 0° with the normal to the groove direction of the grating region 30. This part of the grating also is coated so as to have a low diffraction efficiency of 10%-20%, and the rays are thus partially diffracted out of the waveguide resulting in pupil replication (expansion) in a second dimension 31 orthogonal to the reflected first dimension 27. The resulting emerging light is visible as a image to an observer.

Thus, in this embodiment, a single grating achieves
  image injection into the waveguide
  pupil replication within the waveguide in one dimension
  pupil replication within the waveguide in a second dimension
  diffraction of the expanded pupil image to the user's eye.

Figure 3:
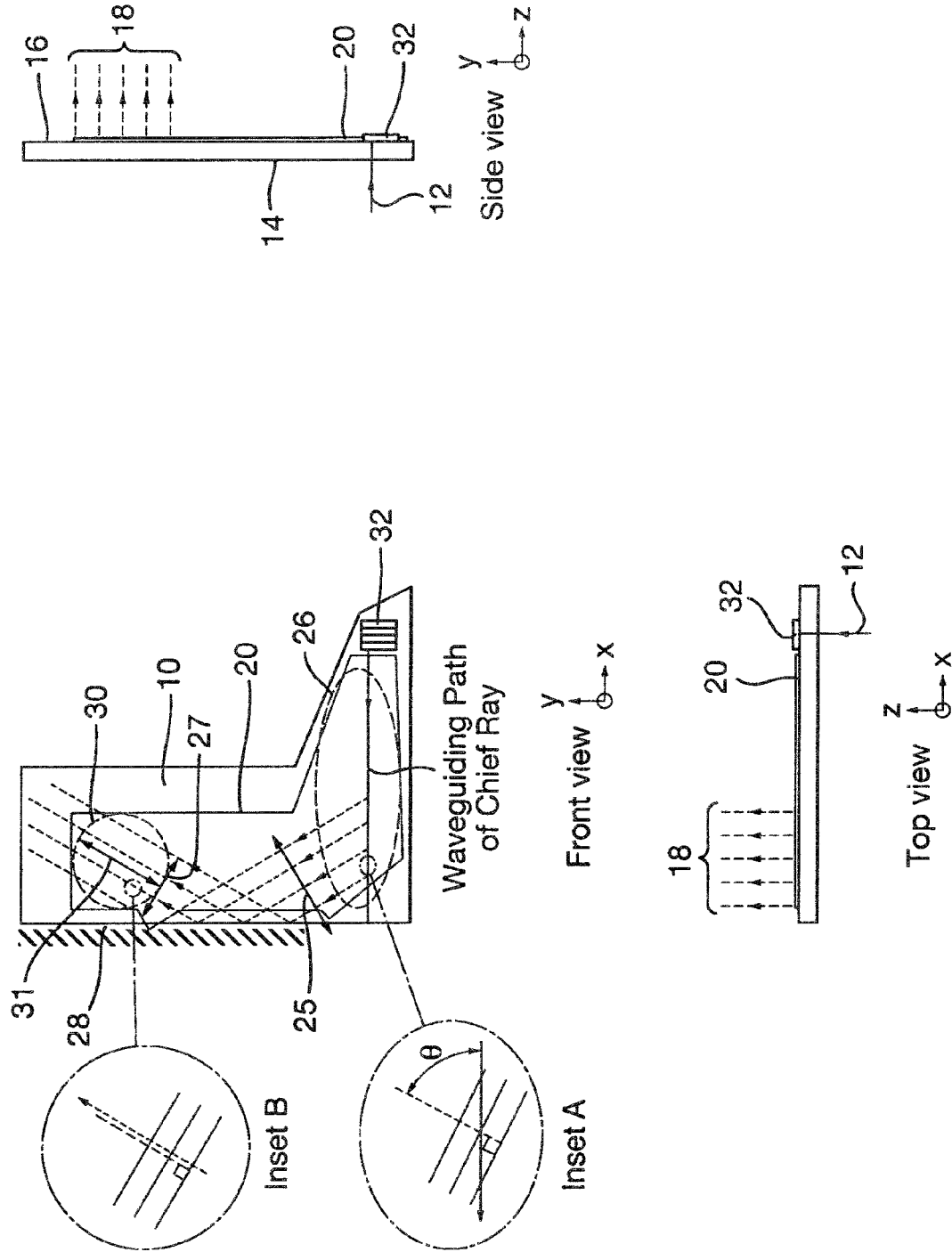
Figure 4:
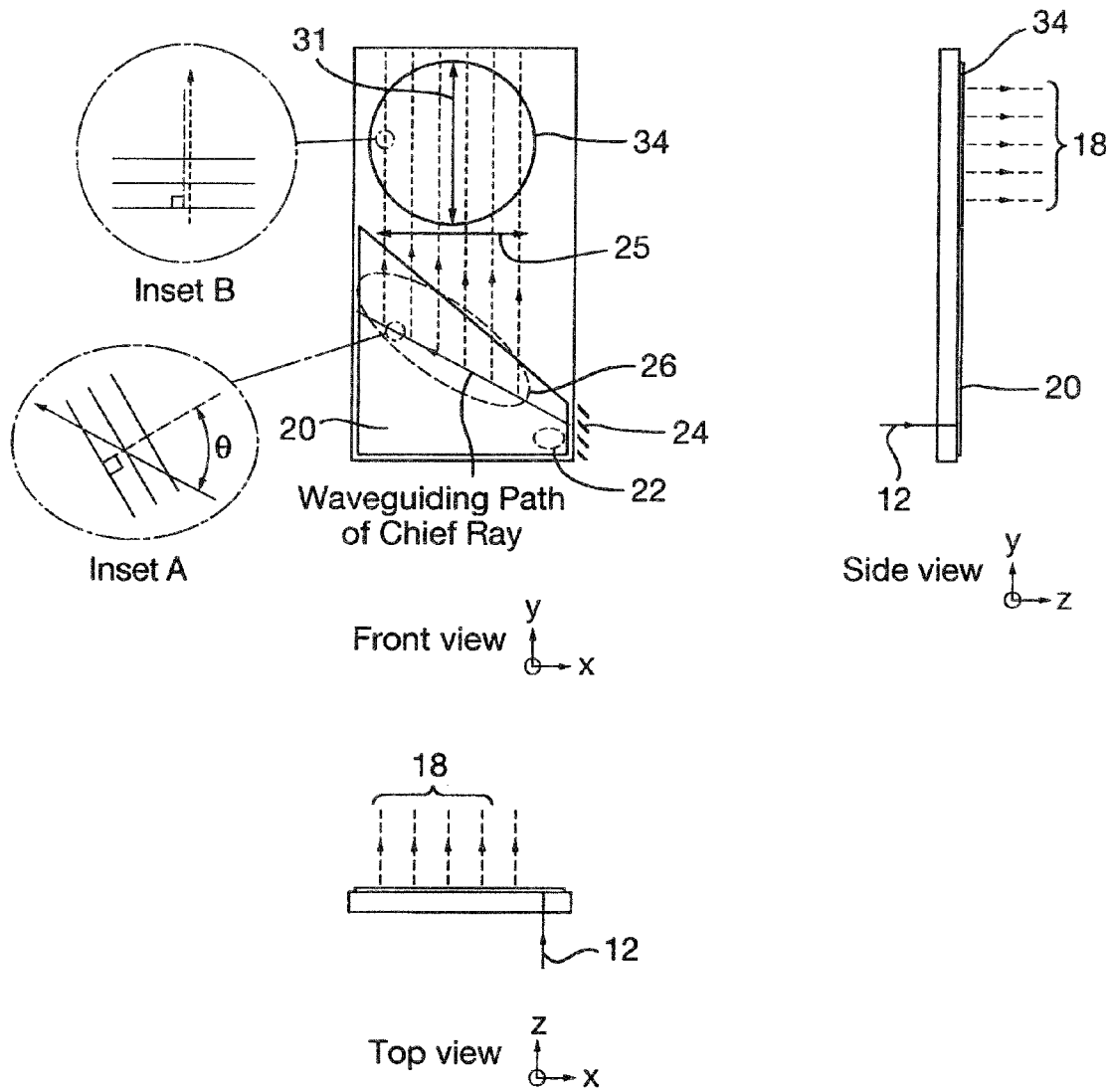

The embodiments of FIGS. 3 and 4 are generally similar to that of FIG. 2, so only the differences will be described. Corresponding parts have the same reference numerals.

In the embodiment of FIG. 3, the input part 22 of the grating 20 is replaced by a separate grating 32, the grooves of which are disposed parallel to the y-axis. This diffracts the incoming image-bearing light 12 directly to the turning part 26 of the grating 20; the reflecting surface 24 is not required. The image-bearing light otherwise propagates through the waveguide 10 in the same way as described with reference to FIG. 2, and so presents a visible image to an observer.

Thus in the embodiment one grating is used for image injection into the waveguide, and the other is used for
  pupil replication within the waveguide in one dimension
  pupil replication within the waveguide in a second dimension
  diffraction of the expended pupil image to the user's eye.

In FIG. 4, the grating 20 is again provided with input 22 and turning 26 parts, and reflecting surface 24 is retained. However it is at a different angle to surface 24 of FIG. 2, being disposed instead parallel to the y-axis of the slab 10. The orientation of the grating 20 also is different, the grooves thereof being inclined at an angle of 60° to the x-axis so that image-bearing light incident on the input part 22 is diffracted and propagated to the reflective surface 24 and thence reflected so that the chief ray propagates and is incident on the grooves of the turning region at 30° (i.e. at $\theta$=60° to the normal to the grooves, inset A).

The light is partially diffracted and expanded in a first dimension (here the x-dimension) and propagates through the waveguide to a second low diffraction efficiency (10%-20%) grating 34 having its orientation (grooves) lying in the x-direction. The diffracted rays are incident normally on this grating (inset B) and are partially diffracted out of the waveguide, the partial diffraction expanding the pupil in a second dimension, here the y-dimension.

Thus a visible image is again presented to the observer.
In this embodiment, one grating is used for
  image injection into the waveguide
  pupil replication within the waveguide in one dimension
  diffraction of the image-bearing light towards the second grating.
The second grating is used for
  pupil replication within the waveguide in the second dimension
  diffraction of the expanded pupil image to the users' eye.

In all embodiments of the invention the gratings 20, 32, 45 may be formed by any convenient conventional means, e.g. by physically removing material or by holography. The reflective surfaces 24, 28 may be optically coated to control this reflectance and/or the polarisation state of the reflected light. They may also be embedded reflective surfaces rather than exposed edges, e.g. if necessary to protect them.

The reflective surfaces 24, 28 may be optically coated to control their reflectance and/or the polarisation state of the reflected light.

The groove spacing d of the grating 20 is chosen according to known principles to optimise the display response and will depend on the required field of view, the refractive index of the waveguide and the wavelength of the light.

The invention also includes any novel features or combinations of features herein disclosed whether or not specifically claimed. The abstract of the disclosure is repeated here as part of the specification.

In a slab waveguide which expands an image-bearing pupil into a visible image, reflective edge surfaces are used to redirect once-diffracted light back through the same grating structure. The number of separate grating structures thereby can be reduced to two or even one, compared to three in the prior art.

The invention claimed is:
1. An optical waveguide in which in operation light propagates by total internal reflection, comprising:

two parallel surfaces between which light propagates within the waveguide parallel to those surfaces by total internal reflection;

a grating structure having three diffraction regions, a first diffraction region being for diffracting image-bearing light into the waveguide, a second diffraction region being for further diffracting the image-bearing light so as to expand it in a first dimension and a third diffraction region being for further diffracting the image-bearing light so as to expand it in a second dimension and for releasing it from the waveguide as a visible image, wherein at least two of said diffraction regions have aligned gratings; and at least one reflecting edge surface which reflects light received from one of said at least two diffraction regions back to the other of said at least two diffraction regions for a further diffraction, the reflecting edge surface being perpendicular to the two parallel surfaces of the waveguide.

2. The waveguide of claim 1 wherein the reflecting surface is a specular reflecting surface.

3. The waveguide of claim 1 wherein the reflecting surface is an edge surface of the waveguide.

4. The waveguide of claim 1 wherein the reflecting surface is embedded within the waveguide.

5. The waveguide of claim 1 wherein the reflecting surface has an optical coating whereby to control the reflectance of the surface and/or to control the planarization of light reflected therefrom.

6. The waveguide of claim 1 wherein a said reflecting surface is positioned to receive image-bearing light which has been expanded in the first dimension by diffraction by the second diffraction region, and to reflect it back to the grating structure for further diffraction to expand it in the second dimension by the third diffraction region.

7. The waveguide of claim 6 wherein the grating structure comprises identically-oriented diffraction regions which respectively diffract the light to expand it in the first and second dimensions.

8. The waveguide of claim 7 wherein the identically oriented gratings are parts of a single grating.

9. The waveguide of claim 6 wherein the first and second diffraction regions comprise identically oriented gratings which respectively diffract the light into the waveguide and expand it in the first dimension.

10. The waveguide of claim 9 wherein the grating structure comprises a further grating for diffracting the light into the waveguide.

11. The waveguide of claim 1 wherein a said reflecting surface is positioned to receive light which has been diffracted into the waveguide by the first diffraction region and to reflect it back to the grating structure for diffraction to expand it in the first dimension by the second diffraction region.

12. The waveguide of claim 11 wherein the grating structure comprises a further grating for expanding the light in the second dimension and releasing it from the waveguide as a visible image.

13. A helmet-mounted, head-mounted, head-up or other display device comprising the optical waveguide of claim 1.

* * * * *